United States Patent

[11] 3,552,439

[72] Inventor Chester A. Siver
 10 Fair Hill Lane, Suffield, Conn. 06078
[21] Appl. No. 681,234
[22] Filed Nov. 7, 1967
[45] Patented Jan. 5, 1971

[54] PLUG VALVE WITH RESILIENT SEAL
 15 Claims, 11 Drawing Figs.
[52] U.S. Cl. ................................................. 137/625.47,
 251/175, 251/309, 251/315, 251/317
[51] Int. Cl. ....................................................... F16k 5/14,
 F16k 11/00
[50] Field of Search............................................ 251/175,
 309, 315, 317; 137/625.42, 625.46, 625.47

[56] References Cited
 UNITED STATES PATENTS
| 1,309,732 | 7/1919 | Hawley | 251/175 |
| 1,862,214 | 6/1932 | Fremont | 251/175UX |
| 1,871,965 | 8/1932 | DuBois | 251/175 |
| 2,086,001 | 7/1937 | Shaw | 251/175 |

FOREIGN PATENTS
| 1,012,501 | 8/1957 | Germany | 251/315 |
| 547,590 | 5/1956 | Belgium | 251/175 |
| 1,139,404 | 7/1957 | France | 251/175 |

*Primary Examiner*—Clarence R. Gordon
*Attorney*—Peter L. Costas

ABSTRACT: There are disclosed plug valves having positive sealing means. The valves have a principal plug rotatably seated within an internal chamber of a housing, which has inlet and outlet openings, and a secondary plug slideably received in a channel of the principal plug. The principal plug has a flow path, generally perpendicular to the axis of the channel, and the secondary plug has a sealing face alignable with an outlet opening of the housing. The principal plug may be positioned so that the flow path aligns between an inlet and outlet, providing a conduit therebetween, or it may be rotated to align the channel, and hence the secondary plug, between the openings. In this position upstream fluid bears against the secondary plug and slides it against the surface of the housing about the outlet opening to produce sealing engagement therewith.

PATENTED JAN 5 1971

INVENTOR
CHESTER A. SIVER

BY Peter L. Costas

ATTORNEY

INVENTOR.
CHESTER A. SIVER
BY Peter L. Costan
ATTORNEY

3,552,439

PLUG VALVE WITH RESILIENT SEAL

BACKGROUND OF THE INVENTION

Plug valves are commonly used in numerous applications because they are simple to construct and operate and because they provide an essentially unrestricted flow path when they are fully open. As in most valves, however, the seals provided by plug valves are not entirely free from leakage, particularly when used in relatively high-pressure lines. Although the art indicates that there have been numerous attempts to design truly tight seals in such valves, this objective has not been fully realized in relatively simple and inexpensive structures. Not only are the most leak-resistant valves frequently complex in design and expensive, but also they are often subject to rapid deterioration necessitating frequent repair or replacement.

Accordingly, it is an object of the present invention to provide relatively simple, inexpensive and durable plug valves affording positive seals against leakage when the valve is closed.

It is also an object to provide such valves in which the sealing action is responsive to upstream pressure and the effectiveness of the seal created is proportional to the force of such pressure.

Another object is to provide such valves wherein the sealing plug is adapted to variation in design with effective sealing action.

SUMMARY OF THE INVENTION

Figure 1:
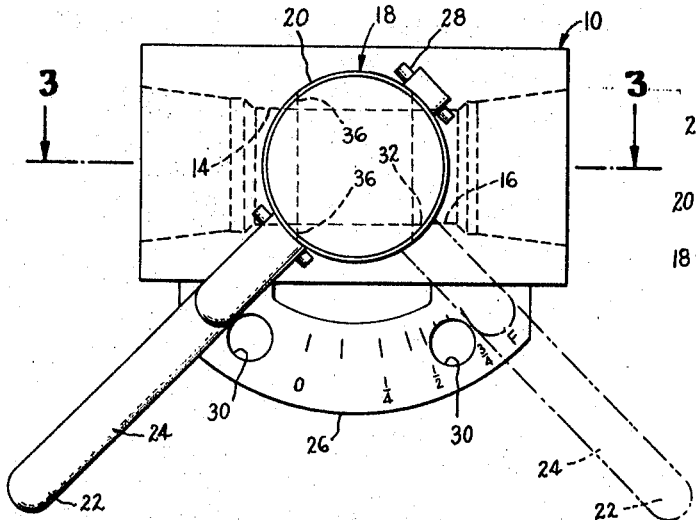
FIG. 1 is a side elevational view of a plug valve embodying the present invention with the operating handle shown in full line in the closed position and in phantom line in the open position.
Figure 2:
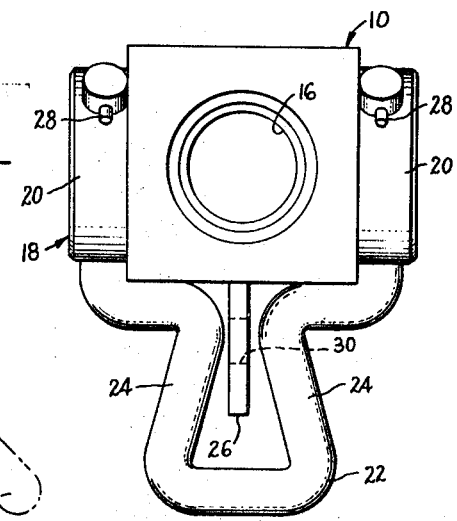
FIG. 2 is an end elevational view thereof.

It has now been found that the foregoing and related objects can be readily attained in a plug valve comprising a housing having an internal chamber and inlet and outlet openings therefor. A principal plug is rotatably seated within the chamber and has a channel through it, the ends of which are alignable with the inlet and outlet openings of the housing by rotation of the plug. The principal plug also has at least two ports which are alignable with the inlet and outlet openings by rotation thereof, and which communicate with the channel and extend from opposite sides thereof to the exterior of the plug.

A secondary plug is slideably received in the channel of the principal plug and is rotatable therewith. It has a flow passage through it and a pair of orifices communicating with the flow passage and aligned with the ports of the principal plug. The secondary plug is cooperatively dimensioned with respect to the principal plug for limited sliding movement therein, and a sealing face on at least one end thereof is dimensioned cooperatively and in conformity with the wall of the housing about the outlet opening to effect closure and sealing thereof. Thus, when the principal plug is rotated so that its channel, and thereby the sealing face on the secondary plug, is aligned with an outlet opening, the flow of upstream fluid passing through an inlet opening of the housing bears against the secondary plug and slides it into sealing engagement with the surface of the housing about the outlet opening.

The plug valves of the present invention are not limited to those which have a single inlet and a single outlet opening, but may have a plurality of such openings. In addition, the passageway through the secondary plug may have a multiplicity of orifices and may have various configurations. Furthermore, various monolithic and composite structures are suitable for the secondary plug, and many modifications of the design and construction of the secondary plug sealing face are also feasible. In a preferred embodiment, the secondary plug is fabricated with resiliently deformable sealing faces on both ends to enable the valve to function when the flow of fluid is in either direction, or to significantly extend the life of the valve by permitting reversal of the secondary plug in the primary plug.

DESCRIPTION OF THE PREFERRED EMBODIMENTS

Referring first in detail to FIGS. 1-4 of the attached drawings, there is illustrated a plug valve embodying the present invention which is designed for installation in a fluid carrying line for completely or partially disrupting the flow of fluid therein when desired. The valve includes a housing or body generally designated by the numeral 10 and having an internal chamber 12 and an inlet 14 and outlet 16 for the chamber 12. It will be appreciated, that the designation of the inlet and outlet in this valve is arbitrary and merely for the purpose of illustration. The inlet and outlet could be reversed both in the drawings and in practical applications also.

A principal plug, generally designated by the numeral 18, is rotatably seated within the chamber 12 and supported within the housing 10 by end portions 20 which extend outwardly of the ends of the bore providing the chamber 12 and slidably bear upon the surface of the chamber. A handle 22 has a pair of legs 24 which straddle the calibrated locking plate 26 on the housing 10 and which extend through apertures in the end portions 20 of the principal plug 12 spaced so as to lock the plug in position within the housing 10, the legs 24 being held in place by locking pins 28. The calibrated plate 26 has holes 30 into which a padlock may be inserted to lock the handle 22 in either the fully open or the fully closed position, and the calibrations on the plate 26 indicate the degree to which the valve is open when the handle 22 is aligned therewith.

Figure 4:
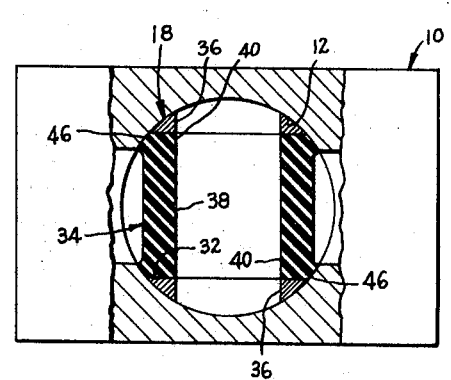
FIG. 4 is a side elevational view of the housing portion of the valve of FIG. 1 with the center portion thereof in partial section to illustrate internal construction.

A secondary plug, generally designated by the numeral 34, is slidably received in the channel 32 in the principal plug 18. A pair of ports 36 in the principal plug 18 are alignable with the inlet 14 and outlet 16 in the housing 10 and communicate with the channel 32 and extend from opposite sides thereof to the exterior of the principal plug 18. Extending through the secondary plug 34 is flow passage 38 with orifices 40 on either end thereof. As is best seen in FIG. 4, the ports 36 of the principal plug 18 are aligned with the orifices 40 at the ends of the flow passage 38 in the secondary plug 34, providing a continuous passageway through the principal and secondary plugs. As will be apparent, aligning the ports 36 with the inlet 14 and outlet 16 by rotation of the principal plug 18 allows fluid to flow through the valve between inlet 14 and outlet 16.

Figure 3:
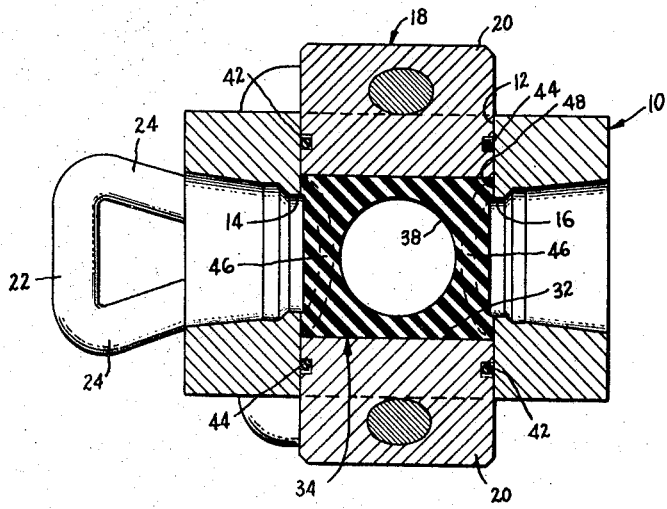
FIG. 3 is a sectional view along the line 3-3 of FIG. 1.

FIG. 3 illustrates one method of minimizing leakage between the housing 10 and the principal plug 18. Two O-rings 42 are seated in annular slots 44 in the surface of the principal plug 18 and bear against the surface of the internal chamber 12 to provide the desired secondary sealing action.

Although the general configuration of the secondary plugs by which the primary sealing action of the present valves is shown in FIGS. 3 and 4, the specific structures of a number of embodiments of secondary plugs are best seen with reference to FIGS. 5-10. The simplest secondary plug is that illustrated in FIGS. 5 and 6, and it is also the plug depicted in the valve of FIGS. 1—4. In this embodiment, the plug 34 is a monolithic structure with a flow passage 38 perpendicular to the longitudinal axis of the plug 34, with orifices 40 at either end thereof. A sealing face at each end of the plug 34 is provided by the generally annular ridges 46 so that, when the secondary plug 34 is forced toward an outlet opening, the ridge 46 bears against the surface of the housing about the outlet opening, such as the cooperating sealing surface 48 in FIG. 3, to seal the opening. To provide this positive sealing action, the monolithic structure is constructed of a relatively resiliently deformable material, and it can be fabricated by any suitable technique, such as casting or injection or compression molding. In addition to providing an effective seal about the outlet, a secondary plug which is made of a relatively resiliently deformable material will, under axial force, compress axially and expand radially. It will thus tend to conform closely to the walls of the channel in the principal plug and greatly enhance sealing action.

Figure 7:
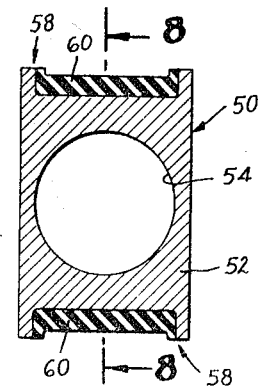
FIG. 7 is a vertical sectional view of another embodiment of secondary plug for use in the valves of the present invention.
Figure 6:
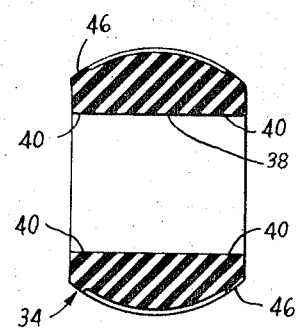
FIG. 6 is a sectional view of the same plug along the line 6-6 of FIG. 5.
Figure 5:
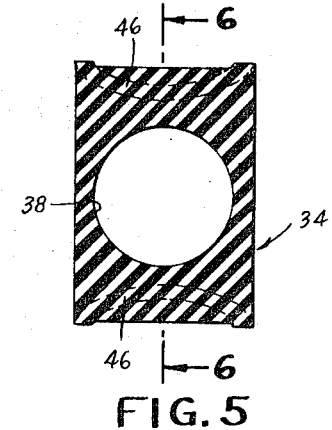
FIG. 5 is a vertical sectional view of one secondary plug used in the valves of the present invention.
Figure 8:
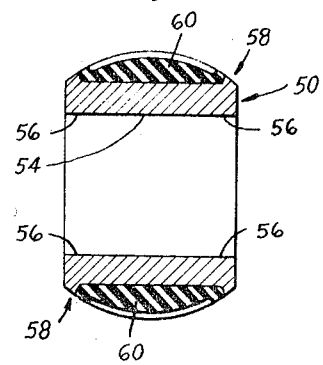
FIG. 8 is a sectional view of the plug along the line 8-8 of FIG. 7.

FIGS. 7 and 8 illustrate a second embodiment of secondary plugs which is somewhat more complex than that shown in FIGS. 5 and 6 since it is a composite of two different materials. The secondary plug generally designated by the numeral 50 comprises a body element 52 having a flow passage 54 therethrough with orifices 56 at either end thereof. Sealing faces, generally designated by the numeral 58, are provided at both ends of the body element 52 by the cooperating surfaces of the body element 52 and the inserts 60. In the illustrated embodiment, the body element 52 of the plug 50 is a hard durable material and the inserts 60 are fabricated of relatively resiliently deformable material to provide a durable and highly effective secondary plug. Conversely, by constructing the body element 52 of the plug 50 of a relatively resiliently deformable material and the inserts 60 of a relatively hard and durable material, resiliency will be furnished by the body element 52 and a desirable level of wear resistance will be provided by the material used for the inserts 60. In such a structure, forcing one of the sealing faces against a cooperating surface adjacent to an outlet opening in the housing will not only cause the rigid insert 60 to bear against the surface, but will also deform the deformable material of the body element about the insert and against this surface to effect a very tight seal about the outlet. Generally, face portions of composite structures should extend slightly beyond the body to permit travel and compression.

Figure 10:
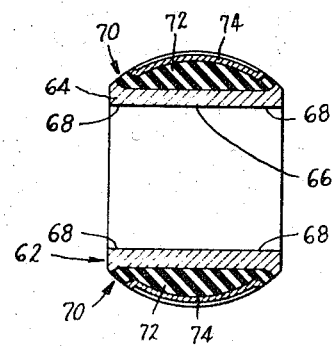
FIG. 10 is a sectional view of the plug of FIG. 9 along line 10-10 thereof.
Figure 9:
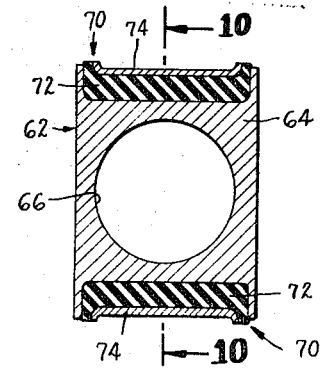
FIG. 9 is a vertical sectional view of still another embodiment of secondary plug.

FIGS. 9 and 10 depict yet another embodiment of secondary plug of the present invention generally designated by the numeral 62 and comprising a body element 64 with a flow passage 66 having orifices 68 at both ends thereof. In this embodiment, the sealing faces, generally designated by the numeral 70, are located on both ends of the body element 64 and are provided by the cooperation of a relatively resiliently deformable interlayer 72 between the body 64 and the insert 74 of hard, durable material. By so constructing the secondary plug, both the body 64 and the inserts 74 can be made of a relatively hard and durable material. The interlayers 72 will enhance sealing action by being forced outwardly around the inserts 74 when pressure is brought to bear against the opposite end of plug 62. The deformable material forced out around the inserts 74 will bear tightly against the cooperative sealing surface around the housing outlet and, in combination with the insert 74, provide a very effective seal. As a result of the use of relatively hard and durable material for both the inserts 74 and the body element 64, the secondary plug of this embodiment is durable and resistant to damage by heat. It should be appreciated that the inserts 74 and the body element 64 may be fabricated of the same material, or the body element 64, the interlayers 72, and the inserts 74 may each be of a different material. Most desirably, the interlayers 74 will be provided by a material which not only is resiliently deformable and tough but also serves as a bonding medium between the inserts and the body element. Alternatively, inserts and interlayers may be adhesively or otherwise secured to the body element.

Having described a number of suitable secondary plugs, operation of one embodiment of the present valves will be briefly described with reference, once again, to FIGS. 1—4. With the operating handle 22 in the position illustrated, namely the fully closed position, upstream fluid will enter the inlet 14 and impinge upon one end of the secondary plug 34, urging it in a downstream direction, i.e., toward the outlet 16. As a result, the sealing face 46 will seat against the cooperative sealing surface 48 to seal the outlet 16. Under the influence of the upstream force and the resistance of the housing surface adjacent outlet 16, the secondary plug 34 will also expand radially, i.e., perpendicularly to the axis of the channel 32 to further enhance the effectiveness of the seal. Moving the handle 22 to the right, or toward the position shown in phantom line in FIG. 1, will open the valve to varying degrees, and, when the handle is moved as far as possible to the right, the flow passage 38 and the ports 40 will be fully aligned between the inlet 14 and the outlet 16, providing an essentially unconstricted passageway for the flow of fluid through the valve.

Figure 11:
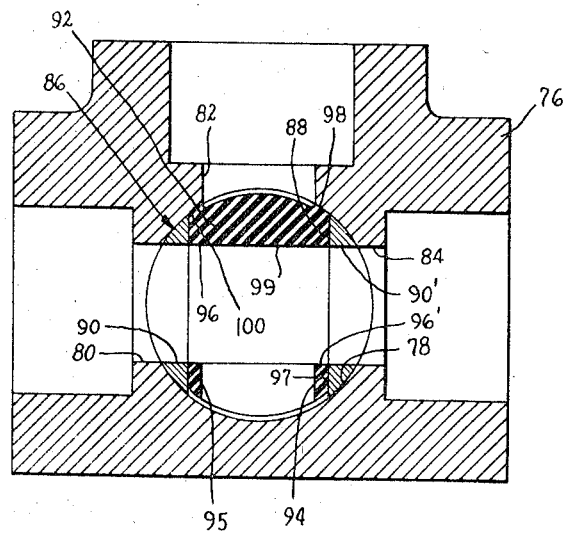
FIG. 11 is a sectional view of the housing portion of another embodiment of the plug valves of the present invention.

Turning now to FIG. 11, a three-way plug valve embodying the present invention is depicted wherein the valve housing 76 has an internal chamber 78 and three openings 80, 82 and 84. Although any two of these openings may be inlet or outlet openings, solely for the purpose of describing the operation of this valve, opening 80 will be considered an inlet, and 82 and 84 outlet openings. Rotatably mounted within the chamber 78 is a principal plug generally designated by the numeral 86 with a channel 88 and a pair of ports 90, 90' on either side thereof and providing communication between the channel 88 and the exterior of the principal plug 86. The secondary plug, generally designated by the numeral 92, is slidably received in the channel 88 of the principal plug 86 and has a T-shaped flow passage 94 with three orifices 95, 96, 96', the orifices 96, 96' being aligned with ports 90, 90' respectively. As shown in FIG. 11, the end 97 of the channel 88 is aligned with the orifice 95, and the sealing face provided by the ridge 98 is situated at the end of the secondary plug 92 which is opposite the orifice 95. Thus, when force is brought to bear upon the surface 99 of the secondary plug 92 opposite the sealing face 98, the secondary plug 92 slides in the channel 88 to cause the sealing face 98 to bear firmly against the cooperating housing surface about the outlet opening to effect sealing thereof.

In the relationship illustrated in FIG. 11, fluid will flow into the inlet 80, through the port 90 and the orifice 96 aligned with the inlet 80, and thereafter outwardly through the orifice 96', port 90' and outlet 84, with which the latter-mentioned orifice and port are aligned. Since no outlet is aligned with the remaining orifice 95, no fluid will flow therethrough. Back pressure, however, will create a component of force normal to the surface 99 which urges the secondary plug 92 toward the outlet 82. This will press the sealing face 98 against the cooperating housing sealing surface 100 to provide an effective seal against the flow of fluid through the outlet 82.

It will be readily apparent that rotation of the principal plug 86 through an angle of 90° from the position shown in FIG. 11 will open the outlet 82 to the flow of fluid and close the outlet 84. Thus, the fluid will flow into inlet 80, through orifices 95 and 96 and thereafter outwardly through the port 90 and the opening 82. However, the sealing face 98 will be aligned with the opening 84, and fluid flowing through the inlet 80 will bear upon the surface 99 to urge the sealing face 98 into sealing relationship with the housing surface about the outlet 84. Port 90' and orifice 96' will be open only to a surface of the internal chamber 78, and fluid will therefor flow only between inlet 80 and outlet 82.

Rotation of the principal plug 86 through an additional angle of 90° (i.e., to a position 180° removed from that shown in FIG. 11) will result in alignment of the orifice 95 with the channel end 97 and outlet 82; alignment of the orifice 96 and port 90 with the outlet 84; and the alignment of the remaining port 90' and the orifice 96' with the inlet 80. Thus, fluid will flow into inlet 80 and out both of the outlets 82, 84. As will be appreciated, by providing two inlets and a single outlet into the valve illustrated in FIG. 11, two streams of fluid can be combined and mixed, or either stream can alternatively be conducted through the outlet opening.

The plug valves of the present invention will in every instance comprise a housing which has an internal chamber and at least one inlet and at least one outlet therefor, but, as will be apparent from the foregoing, the design of the instant valves may be varied to provide more than one inlet and/or outlet. When there is but one inlet and one outlet, these openings will normally be aligned along an axis which is perpendicular to the axis of rotation of the principal valve, and in any case the openings for the chamber should have axes perpendicular to the rotational axis. It is obvious that such an arrangement of openings will afford the simplest way of aligning the ends of the channel in the principal plug and the ports thereof with the openings of the chamber although other arrangements may be utilized.

Since the flow path through the valve must have certain minimum dimensions to accommodate the fluid flow desired, normally the dimensions of the housing and its chamber will be dependent upon the size of the principal and secondary plugs to be received therein. The housing may have a single diameter bore providing the chamber and openings at its ends through which the principal plug may extend, or it may have an enlarged diameter chamber and smaller diameter openings through which the principal plug may extend. In any event, the chamber (and smaller diameter openings if such are employed) are cooperatively dimensioned with the principal plug to snugly seat the principal plug, while permitting rotation thereof, to minimize the likelihood of leakage between the housing and the principal plug and to prevent the buildup of contaminants between the cooperating surfaces. Surfaces of the housing provide the bearing support for the principal plug to rotate therein, and such surfaces may comprise the material of the body of the housing, or separate bearing inserts may be included. Alternatively, the principal plug may be rotatably mounted entirely within the chamber of the housing, but this will normally require a more complex structure because of the necessity for separate elements and seals.

Although the configuration of the principal plug may vary, it must have a circular cross section in all planes perpendicular to the axis of rotation of the principal plug so that it can rotate within the housing and conform closely to the chamber wall in all positions. Thus, for example, the plug (and chamber) should be spherical, spheroidal or, most desirably, cylindrical.

The principal plug must have a passageway by which communication can be established between the inlet and outlet openings. In addition, it must also have a channel for slidably receiving the secondary plug, and the passageway and channel should have axes in a common plane, generally perpendicular to the axis of rotation of the principal plug. With such a relationship, either the passageway or the channel can be aligned between the openings of the chamber by rotation of the principal plug, and it will be apparent that the central portions of the channel and passageway will therefore intersect. The relationship between the passageway and the channel may thus be considered to constitute a channel having ports on both sides which provide communication between the exterior of the principal plug and the channel. It will be appreciated that the principal plug is large enough so that, notwithstanding the provision of a channel and ports, it has sufficient material to afford it adequate structural strength.

Although the cross section of the channel in the principal plug (and therefor the secondary plug) may vary in configuration, a circular cross section is preferred. Since the openings of the valves are normally circular to accommodate pipes and tubes, a secondary plug (which will have the same shape as the channel) which is circular in cross section will generally be best adapted to cover such an opening. Moreover, the close tolerances necessary between the channel and secondary plug may be attained with greater facility with such a configuration. The secondary plug has a flow passage, generally with an axis perpendicular to the longitudinal axis of the plug (i.e., perpendicular to the axis of motion of the plug within the channel), and the flow passage is aligned between the ports in the principal plug so that, when these ports are aligned between the inlet and outlet of the chamber, fluid flow is possible. Normally, it is advantageous to make the cross-sectional area of the flow passage and ports at least as large as that of the inlet and outlet openings so that the flow of fluid is unobstructed when the valve is completely open. To allow rotation of the principal plug, the necessity that the secondary plug not extend beyond the channel openings will be appreciated.

To ensure a tight seal about the outlet in the housing, the secondary plugs employed in this invention are most desirably provided with a sealing face on at least one end, which preferably takes the form of an annular rib coaxial with the axis of the secondary plug itself. A cooperatively configured machined surface on the housing wall about the outlet is desirably provided so that a tight seal against leakage can be created, and, although a resiliently deformable sealing face accommodates slight imperfections in the mating surfaces, a nondeformable material can be used if cooperating surfaces are carefully conformed, such as by lapping.

Alternatively, the surface of the sealing face can be smooth and a raised annular rib can be provided on the surface of the housing about the outlet. As will be readily apparent to those skilled in the art, combinations of such configurations and many alternative configurations are also possible. In any event, however, is usually most desirable to minimize the area of contact about the outlet opening so that the pressure upon the other end of the secondary plug can be utilized with the maximum efficiency in sealing the opening.

As has been mentioned previously, the secondary plug need not have only a single sealing face but may have such a face upon both its ends so that the valve will operate independently of the direction of flow of fluid therethrough. Such a construction is also very desirable in that it can increase the useful life of the valve substantially. Thus, referring again to FIGS. 1—3 of the drawings, it will be seen that by removing the pins 28 from the arms 24 of the handle 22, the handle 22 can be readily disengaged from the principal plug 20. Then the principal plug 20 can be rotated through 180°, even under full pressure, so that the positions of the sealing faces 46 are reversed. A new sealing face will thereby be presented to the outlet 16 and, after reassembly with the handle 22, the valve will be restored to approximately its original effectiveness.

The secondary plugs of the present valves may be a monolithic structure or they may be a composite of two or more materials. Although it is not essential in every case, at least one of the materials out of which the secondary plug is constructed is desirably resiliently deformable since such materials allow compressibility and promote a very tight seal even when the mating surfaces are somewhat irregular. The particular resilient material used will depend upon operating conditions and the specific fluid to be transported through the valve. It should, of course, be relatively tough to withstand extensive use, inert to the material flowing therethrough and resistant to the temperatures at which the valve is to be employed. Depending upon these factors, various natural and synthetic elastomers and resinous polymers such as the nylons, fluorocarbons, etc. may be used.

Alternatively, the secondary plug may be comprised of a relatively resilient member combined with a hard, durable member, either of which may provide the sealing face or the body element, or it may have a relatively rigid body and insert, with a layer of resilient material interposed therebetween. The use of the hard, durable materials will generally increase the life of the valves significantly by providing support and/or protection at the points of friction and stress. It may, in many cases, also be desirable to utilize a fireproof or fire-resistant material at the sealing face to protect the valve against the presence of very hot, or even burning fluids in the system. The particular material used for this purpose will, once again, depend upon the conditions of operation of the valve, but exemplary materials may be ceramics, metals, or relatively rigid thermosetting resins.

Accordingly, it can be seen that the present invention provides relatively simple and inexpensive plug valves with which positive seals against leakage are created when the valve is in a closed position. The positive sealing action is responsive to upstream pressure, and the effectiveness of the seal created is proportional to the force of such pressure. The valves of the present invention are highly flexible in application, easily constructed and rugged so as to provide long life.

I claim:

1. In a plug valve for controlling the flow of fluids, the combination comprising:

a housing having an internal chamber and inlet and outlet openings therefor;

a principal plug having a channel therethrough, said plug being rotatably seated within said chamber and rotatable so as to align the ends of said channel with said inlet and outlet openings of said housing, said principal plug having at least two ports therein communicating with said channel and extending from opposite sides of said channel to the exterior of said principal plug, said ports being alignable with said inlet and outlet openings by rotation of said principal plug; and and a secondary plug slideably received in said channel of said principal plug so as to be rotatable therewith, said secondary plug having a flow passage therethrough and a pair of orifices communicating with said flow passage and aligned with said ports of said principal plug, said secondary plug being cooperatively dimensioned with respect to said principal plug for limited sliding movement of said secondary plug in said channel, said secondary plug being comprised of a body element and an insert of a material different therefrom retained on said body element against substantial relative movement in a recess at one end thereof, said insert providing part of a composite sealing face on said one end of said secondary plug dimensioned to close an outlet opening in said housing when said principal plug is rotated so as to align its channel and thereby said sealing face with said outlet opening, said sealing face being comprised of continuous concentric elements of both said body element and said insert, the flow of upstream fluid passing through an inlet opening of said housing bearing against said secondary plug to produce sliding movement thereof to bring said concentric elements of both said body element and said insert into sealing engagement with the surface of said housing about said outlet opening to provide highly effective sealing action.

2. The plug valve of claim 1 wherein said inlet and outlet openings for said internal chamber are aligned along an axis perpendicular to the axis of rotation of said principal plug.

3. The plug valve of claim 1 wherein said housing has sealing surfaces adjacent and about at least one of said outlet openings configured to cooperate with said secondary plug sealing face for optimum sealing action.

4. The plug valve of claim 1 wherein there is one inlet opening and one outlet opening, and wherein said openings are aligned along an axis perpendicular to the axis of rotation of said principal plug.

5. The plug valve of claim 1 wherein said principal plug is cylindrical and wherein said ports are perpendicular to said channel and cooperate with said channel to provide a passageway having an axis perpendicular to the axis of rotation of said principal plug.

6. The plug valve of claim 1 wherein said secondary plug is elongated and has a circular cross section, and wherein said secondary plug flow passage is perpendicular to the longitudinal axis thereof.

7. The plug valve of claim 1 wherein said secondary plug sealing face includes a generally annular ridge coaxial with the axis of said secondary plug.

8. The plug valve of claim 1 wherein said secondary plug has one of said inserts retained in a recess at each end of said secondary plug, with each of said inserts providing part of a pair of composite sealing faces, one of which is on each end of said secondary plug.

9. The plug valve of claim 1 wherein said insert is of relatively hard and durable material providing part of said sealing face in cooperation with a resiliently deformable portion on said secondary plug thereabout.

10. The plug valve of claim 1 wherein said insert is of a resiliently deformable material.

11. The plug valve of claim 1 wherein said secondary plug has a rigid body element, an insert of relatively hard and durable material and an interlayer of resiliently deformable material, said interlayer cooperating with said insert to provide said sealing face and a resiliently deformable portion about said outlet opening.

12. The plug valve of claim 1 wherein there are three openings for said internal chamber and wherein said secondary plug has a third orifice therein communicating with said flow passage therein to provide a generally T-shaped flow passage.

13. The plug valve of claim 1 wherein there are one inlet opening and one outlet opening aligned on an axis perpendicular to the axis of said principal plug and wherein said principal plug is cylindrical with said ports lying on an axis perpendicular to the axis of said channel and lying in a common plane therewith, said common plane being perpendicular to the axis of rotation of said principal plug, and wherein said secondary plug is elongated with a circular cross section and has a flow passage with an axis perpendicular to the longitudinal axis thereof.

14. The plug valve of claim 13 wherein said body element is of relatively resiliently deformable material and said insert is of relatively hard and durable material cooperating with said body element to provide said sealing face.

15. The plug valve of claim 13 wherein said secondary plug includes a body element, an insert of relatively hard and durable material and an interlayer therebetween of relatively resiliently deformable material, said insert and interlayer cooperating to provide said sealing face.